Aug. 10, 1965  B. F. BORSODY  3,199,397
NAIL ANCHORING DEVICE
Filed Nov. 2, 1962
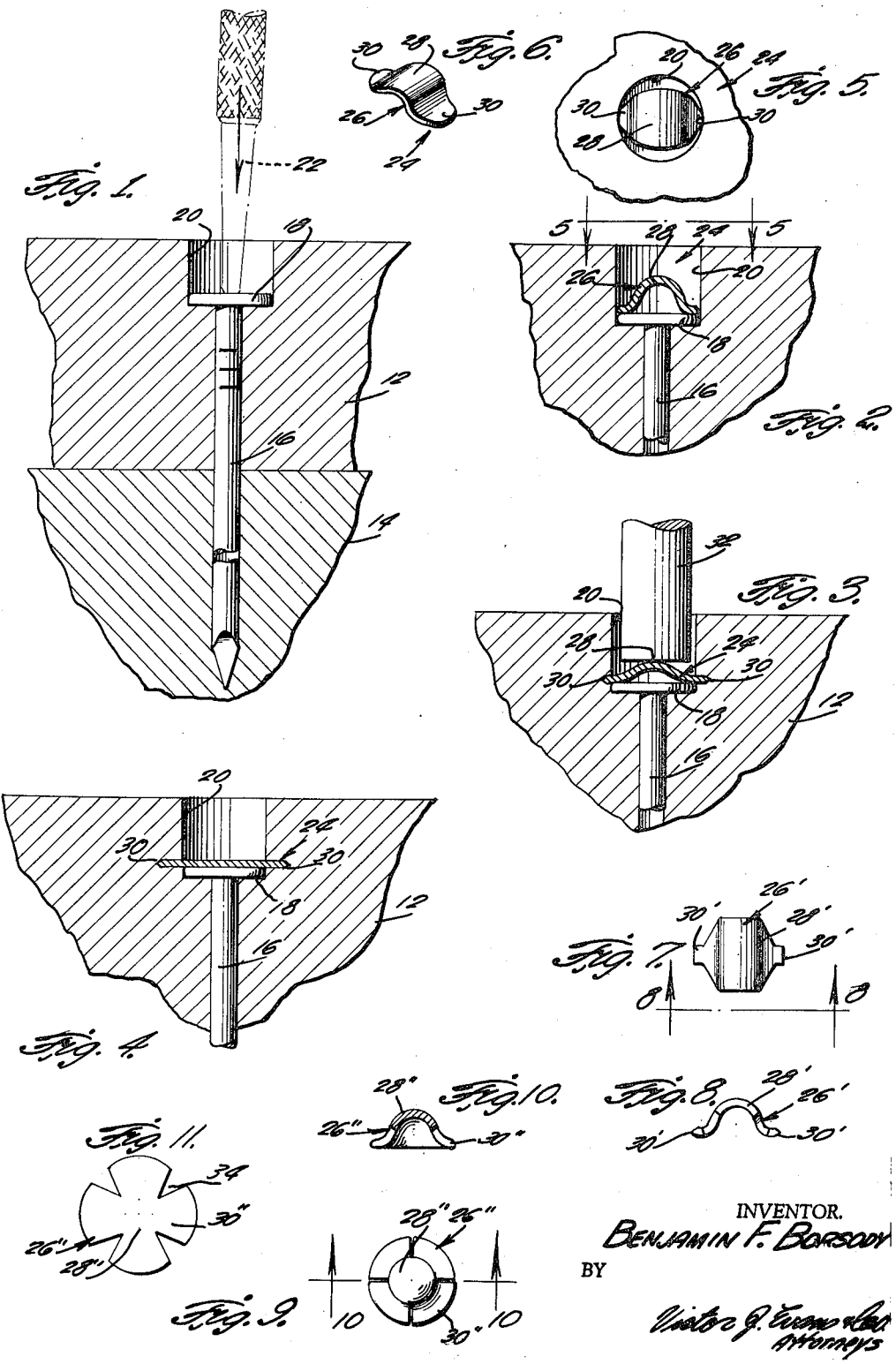
INVENTOR.
BENJAMIN F. BORSODY
BY

3,199,397
NAIL ANCHORING DEVICE
Benjamin F. Borsody, Seoul, Korea (USOM-Korea, UD-COMM, APO 301, San Francisco, Calif.)
Filed Nov. 2, 1962, Ser. No. 234,997
1 Claim. (Cl. 85—23)

The present invention relates to a device for anchoring a countersunk nail, woodscrew, or other fastening element having a head.

An object of the present invention is to provide an anchoring device for a nail, woodscrew, or other fastening device having a head, such device having its head in a countersunk hole provided in the workpiece.

Another object of the present invention is to provide an anchoring device for a fastening element which is simple in construction, one sturdily constructed, one which lends itself to installation with ease and facility, and one which is highly effective in action.

A further object of the present invention is to provide an anchoring device for a nail, woodscrew, or other fastener used in a countersunk hole which is economically feasible, one which may be manufactured in quantity at reasonable cost, and one which prevents the nail, woodscrew, or other device from being removed or inadvertently working out of the workpiece in which it is installed.

These and other objects and advantages of the present invention will be fully apparent from the following description when taken in connection with the annexed drawing, in which:

FIGURE 1 is a sectional view through a pair of workpieces showing a nail installed in a countersunk hole, the dotted line showing representing a tool for driving the nail to its clenching position, FIGURE 2 is a fragmentary view of the assembly shown in FIGURE 1 with the anchoring device of the present invention in position ready for installation, FIGURE 3 is a view similar to FIGURE 2 showing the anchoring device being spread by a tool, FIGURE 4 is a view similar to FIGURES 1 to 3, with the anchoring device in spread and anchored position, FIGURE 5 is a top plan view of the anchoring device according to the present invention, FIGURE 6 is a perspective view of the anchoring device, FIGURE 7 is a plan view of a modified form of the anchoring device, FIGURE 8 is a view taken on the line 8—8 of FIGURE 7, FIGURE 9 is a plan view of a further modified form of the anchoring device according to the present invention, FIGURE 10 is a view taken on the line 10—10 of FIGURE 9, and FIGURE 11 is a plan view of the device shown in FIGURES 9 and 10 as expanded by the use of such a tool as is shown in FIGURE 3.

Referring to the drawing in detail, in which like numerals indicate like parts throughout the several views, a pair of workpieces 12 and 14 are shown in FIGURE 1, and a nail 16 is shown driven into the workpieces 12 and 14.

The nail 16 has a head 18 which fits within a countersunk bore or hole 20 provided in the upper surface of the workpiece 12.

A tool, such as is shown in dotted lines in FIGURE 1 at 22, is employed to drive the nail so that the head 18 seats on the bottom of the hole 20.

In FIGURES 2 to 6, inclusive, the numeral 24 designates generally the device of the present invention which comprises a cap element 26 having an arcuately shaped mid-portion 28 and relatively flat edge portions 30 on each side of the portion 28.

As shown in FIGURE 3, a tool 32 is employed to depress the mid-portion 28 and drive the flat portions 30 into the sides of the hole 20 after the cap element 26 has been placed upon the head 18 of the nail 16.

In FIGURE 4 it will be seen that the edge portions 30 have penetrated the workpiece 12 and secure the head 18 against upward movement in the hole 20.

In FIGURES 7 and 8 a modified form of the cap element 26' is shown in which the mid-portion 28' is arcuately shaped but that the flat edge portions 30' are squared off and are in the shape of lugs.

In FIGURES 9 to 11, inclusive, a still further modified form of the invention is shown in which the cap element 26" has its mid-portion 28" semi-spherical in conformation with the relatively flat edge portions 30" divided from each other by means of slots 34 so that after the tool 32 is applied to the mid-portion 28" the cap element 26" expands and the slots 34 widen as shown in FIGURE 11.

In use, the cap element in each of its forms will be seen to form a means for securing a fastening element in a countersunk hole with the use of a simple tool.

Such elements as woodscrews, nails, spikes, or the like, may be securely held in place within a workpiece or used to secure two or more workpieces together with the cap element guarding the fastening device against removal or displacement from the workpieces.

While only preferred embodiments or forms of the invention are shown and described, other forms are contemplated and numerous modifications and changes may be made in the invention without departing from the spirit thereof as set forth in the appended claim.

What is claimed is:

An anchoring structure comprising in combination a workpiece having a countersunk hole therein, a nail like fastener having a shank extending through the workpiece and the head being round with a smooth planar top surface seated on the base of the countersunk hole and contiguous to the walls thereof, a cap element of harder material than the workpiece being generally arcuately shaped and provided with flat edge portions upon diametrically opposite sides and of reduced width relative to the mid portion thereof for penetration of the side walls of the countersunk opening when the arcuately shaped portion is deformed to a flat shape in superimposed relation to said nail head.

References Cited by the Examiner
UNITED STATES PATENTS

| | | | |
|---|---|---|---|
| 1,007,772 | 11/11 | Davies | 151—5 |
| 1,227,722 | 5/17 | Wills | 85—23 |
| 2,832,390 | 4/58 | Kustusch | 151—41.74 |

OTHER REFERENCES

Ser. No. 382,653, K. Ozuka (A.P.C.), published May 11, 1943.

EDWARD C. ALLEN, *Primary Examiner.*

THOMAS J. HICKEY, *Examiner.*